Aug. 30, 1932.  T. J. MARTIN  1,875,073
METER PROTECTING DEVICE
Filed May 14, 1929
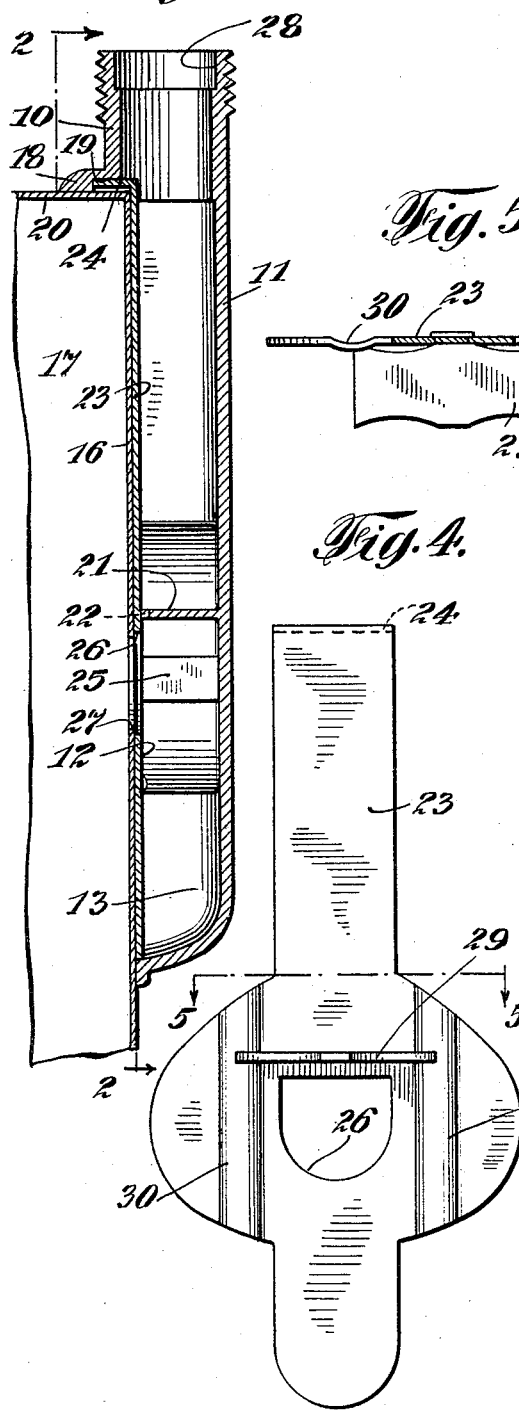
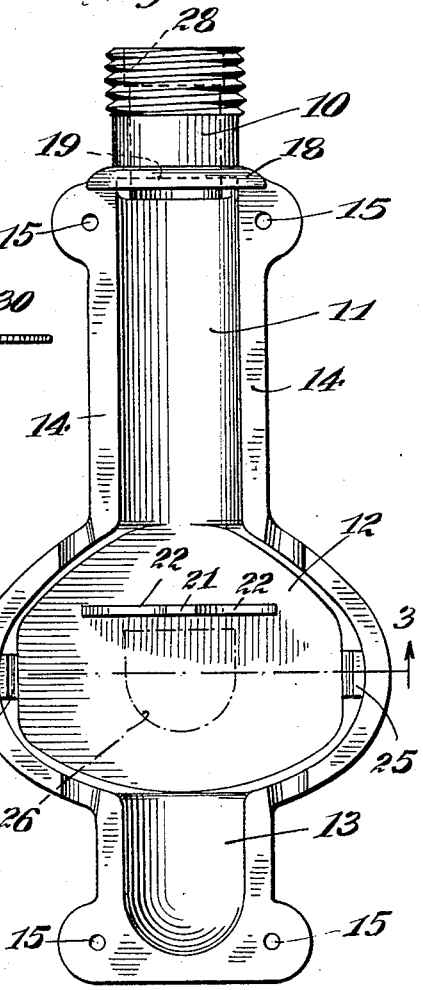
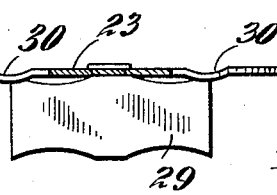
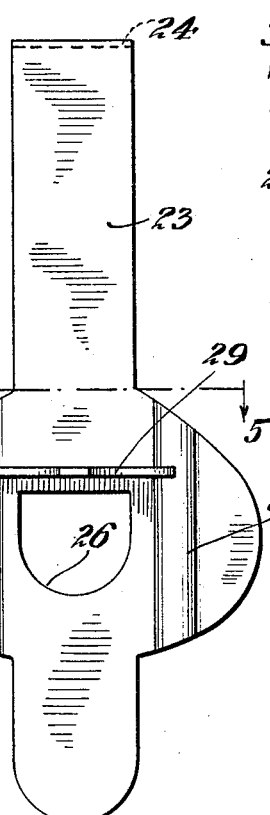
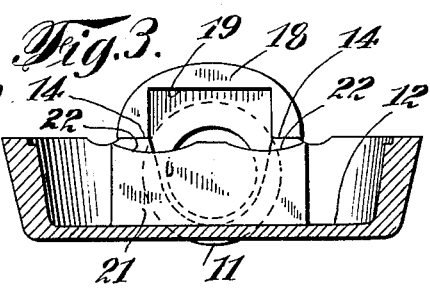
INVENTOR
Thomas J. Martin
BY
ATTORNEY Patented Aug. 30, 1932

1,875,073

UNITED STATES PATENT OFFICE

THOMAS J. MARTIN, OF BROOKLYN, NEW YORK, ASSIGNOR TO SUPERIOR METER COMPANY, OF BROOKLYN, NEW YORK, A CORPORATION OF NEW JERSEY

METER PROTECTING DEVICE

Application filed May 14, 1929. Serial No. 363,043.

My invention relates to meter protecting devices and refers particularly to devices of this character adapted for use with gas meters.

The particular object of my invention is a device capable of attachment to a meter, such as a gas meter, whereby the insertion of a wire into the meter for the purpose of so tampering with it as to affect its measuring mechanism is prevented.

Another object of my invention is a device of the character described in which the flow of gas from the meter is not affected.

The present known devices of this character possess the undesirable attribute of impeding the rate of gas flow, thus lessening the rated capacity of meter and my device overcomes this objectionable feature and presents a means whereby the meter is effectively protected against tampering without affecting the flow of gas through it.

The above and other advantages of the device of my invention will be evident upon a consideration of my specification and its accompanying drawing.

In the accompanying drawing, illustrating modified forms of the device of my invention, similar parts are designated by similar numerals.

Figure 1 is a vertical side view section of one form of my device attached to a meter.

Figure 2 is an elevation view along the line 2—2 of Figure 1.

Figure 3 is a section through the line 3—3 of Figure 2.

Figure 4 is a front view of a modified form of cover.

Figure 5 is a section through the line 5—5 of Figure 4.

The particular form of the device of my invention shown in Figures 1, 2 and 3 of the accompanying drawing, comprises a casing having the tubular portion 10, the semi-tubular portion 11, the enlarged chamber 12 and the semi-tubular portion 13 which is closed at its lower end. A flange 14 surrounds the conduits of the portions 11, 12 and 13, said flange having a plurality of holes 15, 15, through which rivets will attach the device to the side 16 of the gas meter 17.

The portion 10 has the extended support 18, having a recess 19, the support 18 being capable of placement upon the top 20 of the meter 17.

Within the chamber 12 and carried by the wall thereof is a flat baffle-plate 21, the outer edge of which is notched, forming recesses 22, 22.

A cover 23, having an extended protective flange 24, capable of placement within the recess 19, fits within the semi-tubular portions 11, 12 and 13 and is supported by the lugs 25, 25, carried by the portion 12, the face of the cover being flush with the face of the flange 14. The cover has an opening 26 in alignment with the opening 27 of the meter side 16.

Gas entering the device through the openings 27 and 26 moves directly upwardly through the device, passing through the spaces between the edges of the baffle-plate 22 and the sides of the chamber 12 and through the spaces formed by the notched edge of the baffle-plate 22 and the cover 23.

It is to be noted that there is no downward deflection of the gas, which would cause a back pressure, such as results from a downwardly curved baffle-plate which forms a pocket for the gas, but that in my device the upward flow of the gas is unimpeded, which is a most important and valuable improvement over previously known devices of this character.

It will be further noted that the position of the baffle-plate 22 is such that it is impossible to introduce a wire through the opening 28 of the tubular member 10 and into the meter 17 through the openings 26 and 27, thus effectually preventing tampering with the meter.

In the modification of my device shown in Figures 4 and 5, the notched baffle-plate 29 is fixedly attached to the cover 23 instead of the baffle-plate 22 integral with the wall of the chamber 12. The cover 23, in both forms, has two elongated recesses 30, 30 to receive two extended beads carried by the side 16 of the meter 17.

The cover 23 is not essential to the baffle-plate preventive feature of my device, but I prefer to use it as it can be made of case-hardened steel, or of other hard material, thus increasing the difficulty of tapping the upper portion of the device in order to reach the meter for tampering therewith, and hence greatly increasing the efficiency of the device.

It will thus be seen that my device effectively prevents tampering with the meter by means of a wire, while possessing the valuable attribute of allowing an unimpeded flow of gas therethrough.

I do not limit myself to the particular size, shape, number or arrangement of parts as shown and described as these are given simply as a means for clearly describing the device of my invention.

What I claim is:—

1. In a meter protecting device, in combination: a casing having an open side capable of placement against a meter wall, one end of said casing being tubular and the other end being closed; an enlarged chamber within said casing; and a flat horizontal baffle-plate within said chamber and spaced in part from the wall of said chamber preventing the downward passage of a wire through said device and through an opening in said meter below said baffle-plate.

2. In a meter protecting device, in combination: a casing having an open side capable of placement against a meter wall, one end of said casing being tubular and the other end being closed; an enlarged chamber within said casing; a cover closing the open side of said casing and having an opening therein capable of being placed in alignment with an opening in a meter wall and a flat horizontal baffle-plate within said chamber abutting upon the wall of said chamber and said cover and preventing the downward passage of a wire through said device and through the openings in said cover and said meter wall.

3. In a meter protecting device, in combination; a casing having an open side capable of placement against the side wall of a meter, one end of said casing being tubular and the other end being closed; an enlarged chamber within said casing; a cover closing the open side of said casing and having an opening therein capable of being placed in alignment with an opening in said side wall of a meter to which the device is attached; a protective flange to said cover capable of placement upon the top of said meter, and a baffle-plate within said enlarged chamber preventing the downward passage of a wire through said device and through the openings in said cover and said meter side wall.

4. In a meter protecting device, in combination; a casing having an open side capable of placement against the side wall of a meter, one end of said casing being tubular and the other end being closed; said casing having an extended recessed support capable of placement upon the top of a meter to which the device is attached; an enlarged chamber within said casing; a cover closing the open side of said casing and having an aperture therein capable of being placed in alignment with an opening in said side wall of a meter; a protective flange to said cover within said recess of said casing and a baffle-plate within said enlarged chamber preventing the downward passage of a wire through said device and through the openings in said cover and said meter side wall.

Signed at New York city, in the county of New York and State of New York this 7th day of May, 1929.

THOMAS J. MARTIN.